United States Patent
Moschini et al.

[19]

[11] Patent Number: 6,156,247
[45] Date of Patent: Dec. 5, 2000

[54] METHOD FOR PRODUCING SALT GRAINS HAVING A GIVEN PARTICLE SIZE

[75] Inventors: Renzo Moschini, Bologna; Stefano Poggi, Sala Bolognese, both of Italy

[73] Assignee: Magneti Marelli S.p.A., Milan, Italy

[21] Appl. No.: 09/170,121

[22] Filed: Oct. 13, 1998

[30] Foreign Application Priority Data

Oct. 14, 1997 [IT] Italy ................................. BO97A0614

[51] Int. Cl.$^7$ ...................................................... B29B 9/12
[52] U.S. Cl. ............................................................ 264/12
[58] Field of Search .................................................. 264/12

[56] References Cited

U.S. PATENT DOCUMENTS 2,901,435  8/1959  Robson .
4,385,920  5/1983  Dancy .

FOREIGN PATENT DOCUMENTS 1226530  7/1960  France .
2009857  2/1970  France .
2156634  6/1973  France .
WO92/14530  9/1992  WIPO .

OTHER PUBLICATIONS

Abstract of USSR 1310337 (May 15, 1987).

*Primary Examiner*—Leo B. Tentoni
*Attorney, Agent, or Firm*—Hall, Priddy, Myers & Vande Sande

[57]  ABSTRACT

Method for producing salt grains in which the salt is dissolved in a liquid solvent inside a mixing tank so as to form a saline solution which is supersaturated with salt and which is then atomized inside a drying tower where a stream of hot air circulates; the atomizing process being designed to produce a plurality of drops of saline solution, all of approximately the same size, and the stream of hot air being designed to evaporate the liquid solvent contained in each drop so as to cause the salt present in the said drop to solidify into a salt grain of essentially spherical shape; given that the dimensions of the salt grains depend on the dimensions of the drops of saline solution, it is possible to obtain salt grains of the desired size by producing drops of saline solution of a suitable size during the atomizing process.

4 Claims, 1 Drawing Sheet

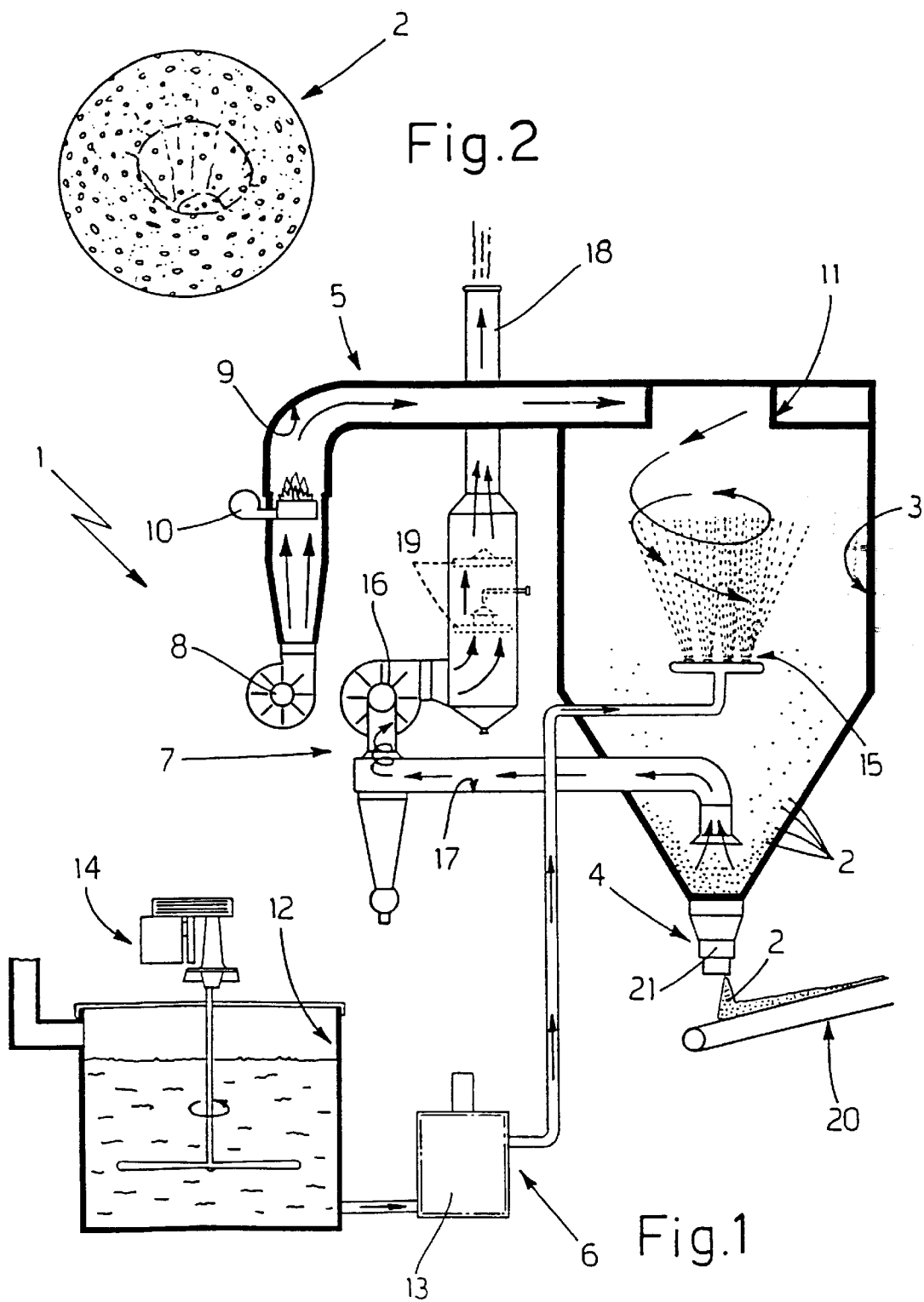

METHOD FOR PRODUCING SALT GRAINS HAVING A GIVEN PARTICLE SIZE

BACKGROUND OF THE INVENTION

The present invention relates to a method for producing salt grains having a given particle size.

More specifically, the present invention relates to a method for producing salt grains having a shape and size suitable for the production of cores for moulds used in the manufacture of pressure die-cast and injection moulded articles, to which the following description will make explicit reference without thereby losing any of its general applicability.

The technique of making cores for moulds used in the manufacture of pressure die-cast and injection moulded articles by compacting salt grains inside moulds bearing a negative impression of the desired core has been known for some time. Indeed, the use of cores made in this way drastically reduces both the time taken and the cost of producing these articles by doing away with subsequent machining operations, and also makes it possible to adopt design solutions which could not otherwise be used with the conventional techniques mentioned.

Unfortunately, however, the use of salt cores for the production of pressure die-cast or injection moulded articles is currently limited by the difficulties encountered in obtaining large quantities of salt grains which are suitable for producing these cores at an industrially acceptable cost.

Through experimentation it has been observed that, in order to withstand the high pressures used in the manufacture of the abovementioned pressure die-cast or injection moulded articles, the salt cores need to be extremely compact and, therefore, the shape and particle size of the salt grains used to produce these cores have to be such as to ensure that the maximum possible density is achieved once the salt grains have been compacted inside the appropriate moulds.

At present, salt grains that are suitable for producing salt cores are only obtained after a lengthy and expensive process involving, firstly, a grinding stage in which generic salt agglomerates are fed into grinders from which salt grains of varying particle size are obtained and, subsequently, a grading stage in which the salt grains produced by the grinders are conveyed into screening machines capable of separating from the stream of salt grains those salt grains that are of a suitable size for producing the salt cores referred to above.

The production process described above has the great disadvantage of giving a low specific yield; consequently, in order to ensure that enough salt grains are produced to satisfy the needs of a large plant for producing pressure die-cast or injection moulded articles, the salt grain production plants needed would have to be of a size and would involve costs such as to discourage their use. Furthermore, the salt grains obtained using the production process described above have many sharp edges and their morphological characteristics do not, therefore, particularly lend themselves to being compacted.

SUMMARY OF THE INVENTION

The object of the present invention is, therefore, to provide a method for producing salt grains suitable for the production of salt cores capable of guaranteeing a high specific yield at reduced costs.

According to the present invention, a method is provided for producing salt grains having a given particle size, characterized in that it comprises the following stages:

dissolving the salt in a liquid solvent to obtain a saline solution;

atomizing the said saline solution inside a drying tower so as to produce a plurality of drops of saline solution inside the said drying tower;

evaporating the liquid solvent contained in each drop of saline solution by bringing the said drops of saline solution into contact with a stream of hot air so as to cause the salt present in each drop to solidify into a corresponding salt grain; and lastly conveying the salt grains out of the said drying tower.

The present invention further relates to a plant for producing salt grains by implementing the method which forms the subject of the present invention.

According to the present invention, a plant is provided for producing salt grains having a given particle size characterized in that it comprises a drying tower having an outlet mouth from which the said salt grains come out; atomizing means designed to atomize a saline solution comprising at least one salt and one liquid solvent inside the drying tower so as to produce a plurality of drops of saline solution; and ventilation means designed to produce a stream of hot air inside the said drying tower which will cause the liquid solvent in each drop of saline solution to evaporate and the salt present in each drop to solidify into a corresponding salt grain.

BRIEF DESCRIPTION OF THE DRAWINGS

The present invention will now be described with reference to the appended drawings which illustrate a non-limiting embodiment thereof, in which:

FIG. 1 diagrammatically illustrates a salt grain production plant built in accordance with the teachings of the present invention; and FIG. 2 illustrates a salt grain produced by the plant illustrated in FIG. 1.

DETAILED DESCRIPTION OF THE INVENTION

With reference to FIG. 1, the numeral 1 denotes, overall, a plant for producing salt grains 2 (preferably, but not necessarily, sodium chloride) having a given particle size, these grains preferably, but not necessarily, being used for the production of salt cores (of known type) employed in the production of pressure die-cast or injection moulded articles.

The plant 1 comprises a drying tower 3 with an outlet mouth 4 at the bottom from which the salt grains 2 having a given particle size come out; a hot air feed unit 5 designed to convey a stream of air at a given temperature into the drying tower 3; a salt solution feed unit 6 designed to atomize a liquid solvent containing salt in solution inside the drying tower 3; and, lastly, a hot air discharge unit 7 designed to convey the hot air generated by the hot air feed unit 5 out of the drying tower 3.

In the example illustrated, the hot air feed unit 5 in turn comprises a blower unit 8 of known type which is designed to convey a stream of air of given value through a feed pipe 9 and into the drying tower 3, and a burner 10 of known type which is located along the feed pipe 9, downstream of the blower unit 8, and is designed to bring the stream of passing air to a temperature of preferably, but not necessarily, between 400° C. and 700° C. The hot air feed unit 5 lastly comprises an air dispenser 11 which is located inside the drying tower 3 and is designed to impart a preferably, but not necessarily, spiral-like trajectory to the stream of hot air coming from the feed pipe 9.

The salt solution feed unit 6, on the other hand, comprises a mixing tank 12, inside which the salt is dissolved in the abovementioned liquid solvent, and a pump unit 13 designed to convey the liquid solvent containing salt in solution from the mixing tank 12 to the drying tower 3 at a pressure of preferably, but not necessarily, between 2 and 4 bar.

In the example illustrated, the salt (preferably, but not necessarily, sodium chloride) is dissolved in the liquid solvent (preferably, but not necessarily, water) so as to obtain a supersaturated solution and the mixing tank 12 is fitted with a mixing device 14 of known type designed to stop the salt suspended in the liquid solvent precipitating at the bottom of the said mixing tank 12.

The salt solution feed unit 6 lastly comprises an atomizing device 15 designed to atomize the liquid solvent coming from the pump unit 13 inside the drying tower 3 in such a way that the atomized liquid solvent comes into contact with the stream of hot air produced by the hot air feed unit 5. In the example illustrated, the atomizing device 15 comprises one or more nozzles which are positioned inside the drying tower 3, upstream of the outlet mouth 4, and point towards the dispenser 11 so that the liquid solvent containing the salt in solution is atomized counter to the stream of hot air, which is travelling in the opposite direction. Needless to say, alternative configurations are possible in which the liquid solvent is atomized in the same direction as the direction of travel of the stream of hot air, in other words in co-current.

With reference to FIG. 1, the hot air discharge unit 7 in turn comprises a suction unit 16 which is designed to suck the hot air from inside the drying tower 3 through a suction pipe 17, the inlet of which is located inside the drying tower 3, directly upstream of the outlet mouth 4, and a chimney 18 designed to convey the hot air sucked up by the suction unit 16 to the outside. In the example illustrated, filtering devices 19 of known type (for example electrostatic precipitators or wet-type filters) are found both upstream and downstream of the suction unit 16, their function being to extract and recover the particles suspended in the hot air drawn from the drying tower 3.

Lastly, the plant 1 preferably, but not necessarily, has a conveyor 20 which collects and transfers the salt grains 2 coming out of the outlet mouth 4, the latter being fitted with an on/off valve 21 for controlling the flow of salt grains 2 coming out of the drying tower 3.

The way in which the plant 1 for producing salt grains works will now be described. It has been assumed that the liquid solvent needed to make the supersaturated salt solution is already present inside the mixing tank 12.

During operation, the salt is poured into the mixing tank 12 where it is dissolved in the liquid solvent in order to make the abovementioned supersaturated salt solution. At the same time, the hot air feed unit 5 and the hot air discharge unit 7 are switched on so as to circulate a stream of hot air inside the drying tower 3.

Once preparation of the supersaturated salt solution is finished, and while the mixing device 14 continues to stir the liquid solvent in order to stop the salt in suspension precipitating at the bottom of the mixing tank 12, the pump unit 13 gradually sucks the supersaturated salt solution out of the mixing tank 12 and conveys it to the atomizing device 15 which atomizes it into minute drops inside the drying tower 3.

Immediately after the atomizing stage, each drop of supersaturated salt solution comes into contact with the stream of hot air which rapidly evaporates the liquid solvent, thereby forcing the salt dissolved therein to solidify into a salt grain 2 of essentially spherical shape (FIG. 2).

Given that the dimensions of each salt grain 2 depend essentially on the dimensions of the drop and on the percentage of salt present in the supersaturated salt solution, and given that atomization produces drops of approximately the same size, the salt grains 2 produced inside the drying tower 3 are all of approximately the same size.

The salt grains 2 subsequently fall into the outlet mouth 4, via which they leave the drying tower 3 and drop on to the conveyor 20, if one is present.

Given that the dimensions of the salt grains 2 depend essentially on the dimensions of the drops of supersaturated salt solution and on the amount of salt dissolved in the liquid solvent, it is possible to determine the particle size of the salt grains 2 coming out of the outlet mouth 4 by varying certain operational parameters of the plant 1.

More specifically, it is possible to increase the size of the salt grains 2 by increasing the diameter of the nozzles of the atomizing device 15; by increasing the viscosity of the supersaturated salt solution; by increasing the specific weight of the supersaturated salt solution; by reducing the percentage of liquid solvent in the supersaturated salt solution; or by reducing the feed pressure at which the pump unit 13 feeds the supersaturated salt solution to the atomizing device 15.

By varying some of the abovementioned operational parameters of the plant it is also possible to regulate the percentage of residual humidity in the salt grains 2 coming out of the drying tower 3. In particular, the residual humidity of the salt grains 2 can be increased by increasing the percentage of liquid solvent in the supersaturated salt solution, by increasing the diameter of the nozzles of the atomizing device 15, or by reducing the specific weight of the supersaturated salt solution.

The main advantage of the method and of the plant 1 described above is that the salt grains 2 coming out of the drying tower 3 possess homogeneous characteristics and, consequently, by suitably adjusting some of the parameters of the plant 1, it is possible to obtain large quantities of salt grains 2 having excellent characteristics for the production of salt cores, that is having an essentially spherical shape and a diameter of preferably, but not necessarily, between 100 $\mu$m and 300 $\mu$m.

In conclusion, it should be clear that modifications and variations can be made to the method and plant 1 described and illustrated herein without thereby departing from the scope of the present invention.

What is claimed is:

1. Method for producing salt grains (2) having a given particle size, characterized in that it comprises the following stages:

dissolving the salt in a liquid solvent to obtain a saline solution;

atomizing the said saline solution inside a drying tower (3) so as to produce a plurality of drops of saline solution inside the said drying tower (3);

evaporating the liquid solvent contained in each drop of saline solution by bringing the said drops of saline solution into contact with a stream of hot air so as to cause the salt present in each drop to solidify into a corresponding salt grain (2); and lastly conveying the salt grains (2) out of the said drying tower (3).

2. Method according to claim 1, characterized in that the saline solution obtained during the dissolving stage is a solution which is supersaturated with salt.

3. Method according to claim 1,
characterized in that during the said atomizing stage the said saline solution is fed to at least one atomizing nozzle (15) at a pressure of between 2 and 4 bar.

4. Method according to claim 1, characterized in that during the said evaporation stage a stream of hot air having a temperature of between 400° C. and 700° C. is used.

* * * * *